(12) United States Patent
Neal et al.

(10) Patent No.: US 10,973,218 B2
(45) Date of Patent: Apr. 13, 2021

(54) BELT VAC SYSTEM

(71) Applicants: Craig Neal, Columbia, PA (US); Joel R. Geiger, Dillsburg, PA (US)

(72) Inventors: Craig Neal, Columbia, PA (US); Joel R. Geiger, Dillsburg, PA (US)

(*) Notice: Subject to any disclaimer, the term of this patent is extended or adjusted under 35 U.S.C. 154(b) by 185 days.

(21) Appl. No.: 15/908,985

(22) Filed: Mar. 1, 2018

(65) Prior Publication Data

US 2018/0249695 A1  Sep. 6, 2018

Related U.S. Application Data

(60) Provisional application No. 62/465,996, filed on Mar. 2, 2017.

(51) Int. Cl.
*A01M 5/02* (2006.01)
*A47L 7/00* (2006.01)
(Continued)

(52) U.S. Cl.
CPC .............. *A01M 5/02* (2013.01); *A47L 5/36* (2013.01); *A47L 7/0085* (2013.01); *A47L 9/0018* (2013.01); *A47L 9/30* (2013.01); *A47L 7/0019* (2013.01); *A47L 7/0052* (2013.01); *A47L 9/0673* (2013.01)

(58) Field of Classification Search
CPC .......... A01M 5/02; A47L 9/0018; A47L 5/36; A47L 9/30; A47L 7/0085; A47L 9/0673; A47L 7/0019; A47L 7/0052
See application file for complete search history.

(56) References Cited

U.S. PATENT DOCUMENTS

| 4,594,807 A | 6/1986 | McQueen |
|---|---|---|
| 4,748,712 A | 6/1988 | DiGiovanni |

(Continued)

FOREIGN PATENT DOCUMENTS

EP  0362169 B1  4/1994

OTHER PUBLICATIONS

Hoover; Ground Command HEPA (10 Quart/1.5 HP) Backpack Vacuum, from Hoovercommercial.com website, printed on Feb. 5, 2018.
(Continued)

*Primary Examiner* — David Redding
(74) *Attorney, Agent, or Firm* — Company Counsel LLC; Ricardo Unikel

(57) ABSTRACT

A pest control device and method and kit for pest control. The pest control includes a main body having a curved shape configured to extend partially or completely around a body of a person, a hose, a collection container operably connected to the hose, and a vacuum mechanism containing a motor. The vacuum mechanism is operably connected to the collection container and the hose. The pest control device also includes a battery operably connected to the vacuum mechanism. The method for pest control includes providing the pest control device, arranging the main body around the body of the person, and activating the vacuum mechanism to suction pests via the hose into the collection container. The kit for pest control includes a main body having a curved shape configured to extend partially or completely around a body of a person, a hose, a collection container, a vacuum mechanism containing a motor, a battery, and a plurality of implements.

7 Claims, 10 Drawing Sheets

(51) Int. Cl.
    *A47L 9/00* (2006.01)
    *A47L 5/36* (2006.01)
    *A47L 9/30* (2006.01)
    *A47L 9/06* (2006.01)

(56) References Cited

U.S. PATENT DOCUMENTS

| | | | | |
|---|---|---|---|---|
| 4,867,360 A | * | 9/1989 | Howard | A47L 13/51 224/245 |
| 4,944,065 A | * | 7/1990 | Svanberg | A47L 5/36 15/327.5 |
| 6,066,211 A | | 5/2000 | Sandell | |
| 6,070,288 A | * | 6/2000 | Luyckx | A47L 9/0009 15/323 |
| 6,393,656 B1 | | 5/2002 | Paterson et al. | |
| 6,568,026 B2 | | 5/2003 | Roy et al. | |
| 7,127,846 B1 | * | 10/2006 | Disler | A01M 1/245 43/132.1 |
| 7,300,172 B1 | * | 11/2007 | Lefler | A47L 9/2836 362/191 |
| 7,721,384 B2 | | 5/2010 | Crevling et al. | |
| 7,845,047 B2 | * | 12/2010 | Loftis | A46B 15/0053 15/398 |
| 9,456,722 B2 | | 10/2016 | Tomasiak et al. | |
| 2002/0050022 A1 | * | 5/2002 | Paterson | A47L 5/36 15/327.5 |
| 2007/0113369 A1 | * | 5/2007 | Cochran | A47L 5/14 15/327.5 |
| 2012/0137569 A1 | * | 6/2012 | Younts | A01M 1/026 43/139 |
| 2020/0003401 A1 | * | 1/2020 | Stevenson | F21V 21/0885 |

OTHER PUBLICATIONS

Parish Supply, Hip Vac Portable Vacuum Cleaner, Wearable Vacuum Cleaner, from www.parishsupply.com website, dated Feb. 22, 2017.

* cited by examiner

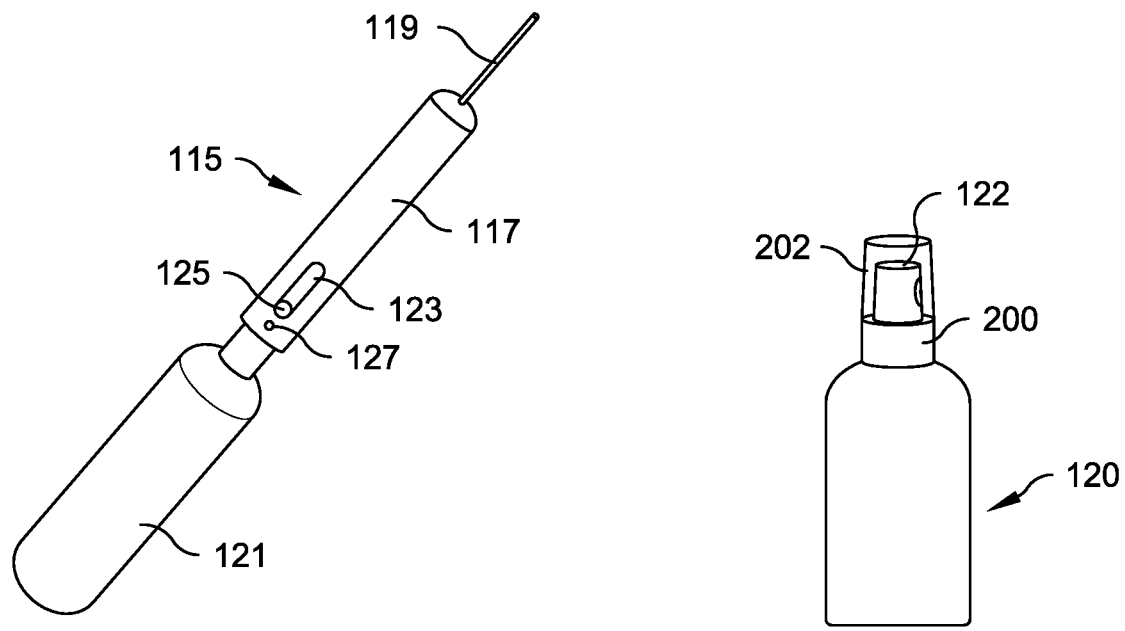
*Fig. 8a*
*Fig. 8b*
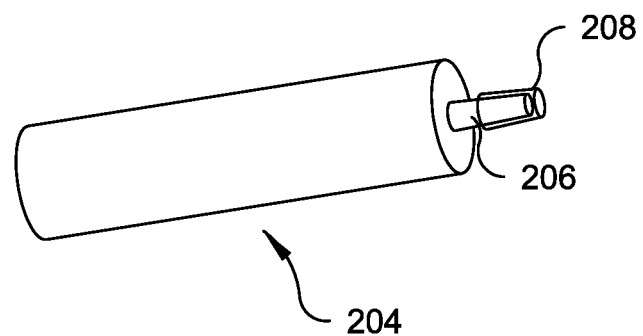
*Fig. 8c*

BELT VAC SYSTEM

FIELD OF THE INVENTION

The present invention relates to new methods of pest control, and equipment for pest control, as well as a kit for pest control. Such new methods and equipment and kit allow control of pests by reducing the amount of toxic chemicals such as poison which are needed.

BACKGROUND OF THE INVENTION

Small insects, if left unattended, can completely destroy a person's home or cause massive damage. Most families are weary of chemicals being pumped into their homes and those chemicals don't always destroy the source of the damage. The present invention looks to introduce an apparatus (and method and kit) for pest control which uses a vacuum belt system to eliminate small organisms, their nests, and disposes of them. There are many problems with using chemicals to treat pests. First, they can be harmful to humans, their pets, and other animals. Second, they may not always be effective since they may not kill all of the desired pests or may only be effective against some pests and not others. Third, they can be dangerous for children and infants. Fourth, they require expertise in use. Additionally, once chemicals are released, they may remain in a location after the pests have been eliminated and continue to be a potential threat.

SUMMARY

The present invention is directed to a pest control device, a method of treating for pest control, and a kit for pest control. The pest control device according to the present invention can include one or more of the following: of a main body having a curved shape configured to extend partially or completely around a body of a person, a hose, a collection container operably connected to the hose, a vacuum mechanism containing a motor, a battery, an attachment mechanism configured to secure the pest control device to the body of the person, an implement container with a plurality of implements therein, an attachment mechanism configured to secure the pest control device to the body of the user, a duster which is substantially or completely enclosed by a rigid casing, and a light source.

In the present invention, preferably, the vacuum mechanism is operably connected to the collection container and the hose, and the battery is operably connected to the vacuum mechanism. The hose can include a nozzle which is configured to be attached to one or more implements at the end of the nozzle. Also, preferably, the pest control device further includes an implement with at least one aperture and/or at least a plurality of protrusions and/or bristles. The implement is operably connected with the nozzle of the hose and can have the light source at the end of the implement.

The light source can be arranged closer to a first end or a second end of the implement. The light source can be configured to be slidable along a longitudinal direction of the hose and/or the nozzle of the hose. The implements can include openings at ends thereof and/or at portions of the implements located between the ends of the implements. The hose of the pest control device can include a nozzle. The pest control device can include a clip on the main body configured to secure the nozzle on the main body. The clip is preferably configured for one handed attachment and detachment of the nozzle on the main body. Also, the clip is preferably configured to attach the nozzle to the main body such that a longitudinal direction of the nozzle is substantially parallel to a longitudinal direction of the main body.

The method for pest control can include providing the pest control device, arranging the main body of the pest control device around the body of the person, and activating the vacuum mechanism to suction pests via the hose into the collection container. The pests can be located inside a crevice or opening in a building structure, or underneath an appliance. The method can include illuminating underneath the appliance or inside the crevice or opening prior to or concurrent with activating the vacuum mechanism to suction pests via the hose into the collection container. The method can include directly or indirectly attaching an adapter to the nozzle of the hose and suctioning pests via the adapter. The method can also include storing a plurality of implements in the implement container and it can include dusting an opening or crevice with a powder which is harmful to pests.

The kit according to the present invention includes one or more of the following: a main body having a curved shape configured to extend partially or completely around a body of a person, a hose, a collection container, a vacuum mechanism containing a motor, a battery; and a plurality of implements.

BRIEF DESCRIPTION OF THE DRAWINGS

FIGS. 7a-7d show side views of additional adapters according to the present invention.

FIGS. 8a-8c show side views of implements according to the present invention.

DETAILED DESCRIPTION OF THE INVENTION

Figure 1:
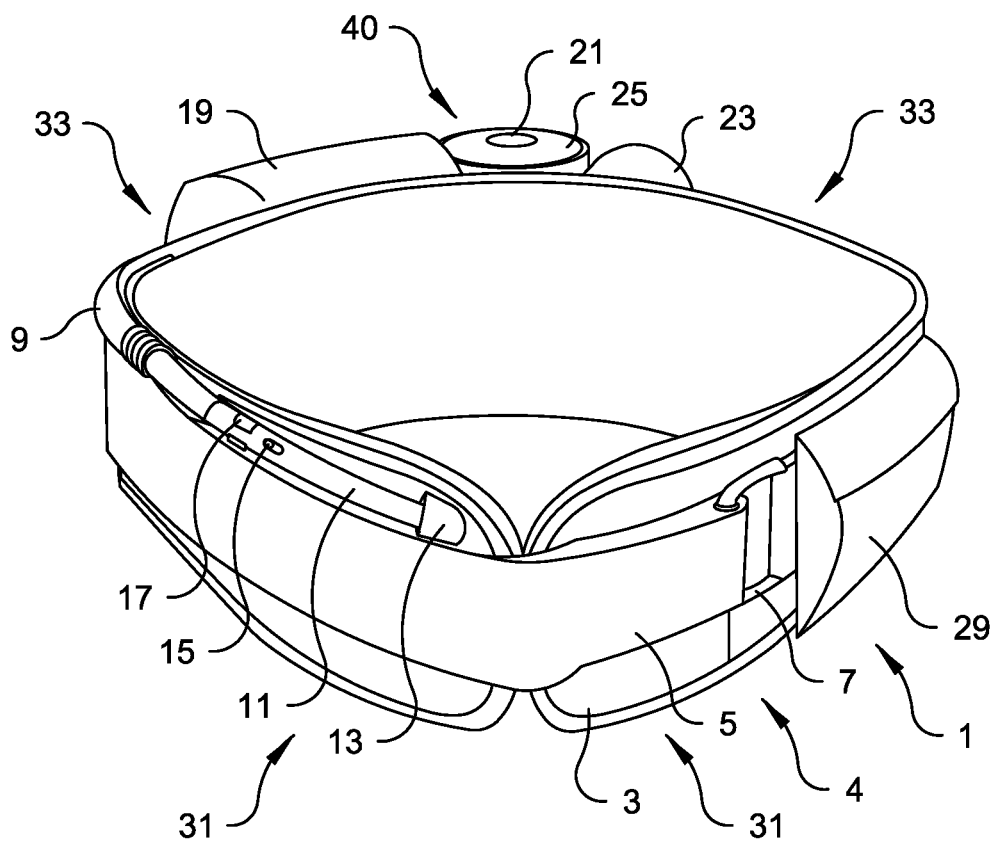
FIG. 1 shows an isometric view of the pest control device of the present invention.

As stated above, there is a need to be able to treat pests with fewer chemicals or without chemicals at all. The present invention addresses this issue by utilizing a novel equipment as well as a novel method for such treatment as well as a kit for such treatment. One skilled in the art will appreciate that the novel equipment described herein can be used in other ways, such as to clean a house, car, bus, plane, train, etc. Basically, it can be used to clean any internal structure of a building or vehicle, whether commercial or residential.

All illustrations of the drawings are for the purpose of describing selected versions of the present invention and are not intended to limit the scope of the present invention. The present invention is a device used for pest elimination that uses innovative methods that doesn't require chemicals or traps, or that can help treat pests with fewer chemicals or traps than if the device had not been used. Moreover, the device allows the user to quickly and safely address a bug infestation in a unique and effective manner.

In some embodiments, the present invention is directed to a pest management system that a technician who is treating for pests can wear around their waist. The pests are primarily eliminated by the use of a vacuum system that is part of the pest management system, thereby eliminating the requirement to use chemicals to remove pests. In the present disclosure, the equipment used for pest control can also be referred to as a pest management system. This vacuum system can trap pests, eggs, molt, and food sources for pests for later disposal such as once the container in the vacuum system gets full. The pest management system of the present invention can be used for Integrated Pest Management since it includes tools for technicians to carry out a full spectrum of pest treatment while reducing harm to the environment by reduced use of toxic chemicals.

The detailed description set forth below is intended as a description of some, but not all, of the configurations of the subject technology and is not intended to represent an exhaustive list. The detailed description includes specific details for the purpose of providing a thorough understanding of the present invention and subject technology. The subject invention and technology is not limited to the specific details set forth herein and may be practiced without these specific details. In other instances, well-known structures and techniques have not been shown or described in detail so as not to obscure the disclosure.

The pest control device of the present invention is all inclusive on a body contoured compact belt. The device will withdraw pests from their nests and gathering areas, along with their molt, droppings, and food sources, including debris associated with pest infestation, and using significant vacuuming power with a powerful illumination light on the end where the placed vacuuming nozzles (otherwise referred to as adapters or generically as implements) will be utilized. Telescopic wand/nozzle assemblies allow a pest technician to reach areas of normal inaccessibility from other types of vacuum devices. In some embodiments, the device will include a 2-speed motor ability for stronger vacuuming power in areas needing it. In an embodiment, the device can accommodate different nozzles for the vacuum to access different areas. The catch device canister will completely contain the live pests, dead pests, nesting material, and food sources in a safety sealed canister with different methods of disposal. This device utilizes a HEPA filtration exhaust system of high efficiency so as to minimize any recycling of insects or their associated filth into an occupied or unoccupied dwelling.

In some embodiments, the present invention includes an attachable lightweight belt that fastens around the user's waist, a cordless powered motor, a rechargeable battery, a protective sealed catch device within a secured canister, a vacuum system, and a HEPA filter. In an embodiment, the present invention can also come with an illumination attachment tip to light up hard to see and tight areas. The invention also comes with compartments on the belt for specific implements and includes unique safety disposal methods. The canister can also come with a sealed bag system to trap the insects in a bag.

Although the present invention is designed to be operably connected to user's waist, it is possible to include adjustable straps for operably connecting the device to the user's shoulders for additional or even sole support. One of the advantages of the present invention is that it may be used without any pesticides. It especially does not need to be used with liquid pesticides or liquid poisons of any kind. There is also no need for liquid flushing agents or any type of aerosol canisters for application of any liquids. Since the present invention is ergonomic, it does not require a frame to enclose multiple components. There may be a container to include various implements, such as nozzles. However, the vacuum device, the motor, the battery, and the implements do not need to all be housed within the same frame. In fact, the vacuum device, the motor, and the battery can be housed separately.

FIG. 1 shows an isometric view of the pest control device 1 of the present invention. The pest control device 1 includes a variety of features. The main body 3 of the device is preferably made of plastic and/or aluminum and/or fabric, and/or another lightweight material for comfort of the user. The main body 3 is configured to be worn around the waist of a person. The main body is "C" shaped and can extend partially or completely around someone's waist. In an embodiment, an attachment mechanism 4, such as a belt 5 and buckle 7 is part of the pest control device and the belt 5 is wrapped around the buckle 7 for a secure and customizable fit. The attachment mechanism 4 is what holds the pest control device 1 on the waist of the user. Other ways to engage the pest control device with a person is with using a belt 5 with holes and a buckle 7 that can engage the holes with a prong such as is common with belts used to hold pants. Another way to secure the belt 5 is with hook and loop fasteners (such as those sold under the Velcro brand). The hook and loop fasteners can also be used instead of the belt 5 to secure the pest control device 1. Another way to secure the pest control device 1 in combination or in lieu of a belt 5 is to use an elastic in order to accommodate different body types, such as an elastic that extends partially or completely around the pest control device 1. The elastic can be an extension of the belt 5 or be used instead of the belt 5.

In an embodiment, the pest control device 1 includes a hose 9, such as a flexible spring-back hose. The hose 9 can be expandable so that it can fit around the pest control device 1 and yet be able to reach beyond the pest control device 1. The hose 9 can be made of flexible polymer having an accordion-like structure to be expandable. In another embodiment, the hose 9 can be sufficiently flexible to be wrapped around a roller for compact storage on the pest control device 1 while not in use. Expandable vacuum hoses are known in the art and further explanation is not needed. The hose 9 can also be removable so that a user can swap out the hose 9 for one of a different length or width. The hose 9 can have a nozzle 11 that is used to suction pests and associated materials, such as food, excrement, eggs and moltings. The nozzle 11 can include a cap 13 for protection of the nozzle 11 when not in use. The hose 9 or nozzle 11 can also include an on/off button 15, which can have more than two settings such as off and two levels of "on" power for different needs of suctioning power. The on/off button 15 can be on a portion of the hose 9 or a portion of the nozzle 11.

The pest control device 1 can include a fastener 17 such as holster clip 17 designed to accommodate and secure the hose 9. Preferably, holster clip 17 is a "tuck and clip" fastener which is designed for one handed operation and can hold part of hose 9 and/or nozzle 11 substantially horizontally on the belt. Preferably, part of hose 9 and/or nozzle 11 extends substantially along a longitudinal direction of the main body 3. The clip 17 can be made of polymer (e.g., plastic) which is somewhat flexible and can accommodate the insertion of the nozzle 11 by deforming the clip 17 while the nozzle 11 is being inserted and have the clip 17 return to its original shape to secure the nozzle 11. To remove the clip 17, when force is applied to clip 17, it will deform the clip 17 and allow the nozzle 11 to be detached from clip 17. Since the hose 9 is flexible, there is no need for any rotation of the hose 9 in any direction in any location so the invention may not need any rotating parts associated with the hose to administer a vacuum.

The pest control device 1 includes a collection device 19 such as a collection bag in a plastic case. The collection device 19 completely encloses its contents so that the contents cannot accidentally exit the collection device 19 to avoid contaminating areas with pests and other unwanted materials. The collection device 19 may be fluidly connected to the hose 9 and may engage hose 9 such that the pests and other particles that are vacuumed are trapped by the collection device 19.

In an embodiment, the pest control device 1 includes a vacuum mechanism 21. This vacuum mechanism 21 is powered by a battery 23. The vacuum mechanism 21 includes a motor (not shown) to power the vacuum mechanism 21 with the energy for the motor being provided by the battery 23. The vacuum mechanism 21 includes an outlet 25 for the air which is vacuumed to exit the vacuum mechanism 21. This air would have been filtered by the collection device 19 and would be clean. While collection device 19 and vacuum mechanism 21 are operably connected, they are distinct parts that are preferably not contained in a same container for ease of replacement of the collection device 19. Similarly, the collection device 19 and the vacuum mechanism 21 are operably connected and yet they preferably are distinct parts that are preferably not contained in a same container for ease of replacement of the collection device 19. The battery 23 can be rechargeable or not rechargeable. It is preferably rechargeable. The battery 23 can be recharged by plugging it into a cigarette lighter in a vehicle, a USB port in a vehicle, a wall outlet, and wirelessly (see explanation below with respect to battery 81 for wireless charging). Battery 23 can have a plug into which chargers can be, directly or indirectly, inserted for charging. Battery 23 can have a cable that is plugged into an outlet or other electricity source. Charging technology is known in the art and no further explanation is needed. The battery 23 can be an alkaline battery, a nickel metal hydride battery, a lithium ion battery, a cadmium battery, or another type of battery. Preferably, it is a lithium ion battery.

The motor inside the vacuuming mechanism can be a 2-speed motor for stronger vacuuming power. Since the motor will be adjacent to a human body, if it gets hot, it may cause discomfort or burns. Accordingly, the motor may have cooling mechanisms such as fins and/or one or more fans to cool down. Also, insulating material may be placed around parts that get hot to avoid discomfort to the user of the pest control device 1. Insulation can also be added between the motor and the main body 3 or between the motor and parts that are readily accessible to the user, such as the top part of the vacuum mechanism 21. Thus, insulation can be placed between the motor and the top part of the vacuum mechanism 21.

The pest control device 1 can include various implements which are stored in an implement container 29. The collection device 19, vacuum mechanism 21, battery 23 and implement container 29 are secured to the main body 3 via various ways. For example, objects 19, 21, 23, and 29 can have straps that can engage the belt 5 or can have loops that can be engaged by the belt 5. The attachment can also be made through the use of hook and loop fasteners between the item being attached to the main body 3 and the main body 3. Other ways for attachment can include buttons or snaps. In the present invention, an implement is a tool, utensil, or other piece of equipment that can be used for pest control. One example of implements can be adapters for the hose 9 or the hose nozzle 11.

Preferably, the front portions 31 of the pest control device 1 are smaller than the rear portions 33 for the comfort of the user in case the user needs to bend over. In particular, the height of the front portions 31 is less than the rear portions 33. The main body 3 can have a shape where it starts narrow at the front and continuously or discontinuously gets broader until it gets to the opposite side where it would be the highest at the high portion 40.

Also, for additional comfort or to accommodate preferences such as being right handed versus left-handed, one or more of the collection device 19, vacuum mechanism 21, battery 23, and implement container 29 can be slidable along the belt 5 by using loops that go around the belt and hook and loop fasteners that can keep the implements from sliding when not wanted. For example, the implement container 29 can have a loop that goes around the belt 5 allowing implement container 29 to be slidable along a longitudinal direction of the belt 5. The belt 5 and the implement container 29 can also have hook and loop fasteners in addition to or in lieu of the loop to make sure that the implement container 29 does not slide when it's not desired for it to slide. The same can be done with the collection device 19, vacuum mechanism 21, and battery 23 provided that the connections remain in place for the air to go from the collection device 19 to the vacuum mechanism 21, and that the vacuum mechanism 21 is electrically connected to the battery 5. The collection device 19, vacuum mechanism 21, battery 23, and implement container 29 can be connected to the main body 3 solely with the use of strong hook and loop connectors which would allow someone to reposition objects as convenient, provided that the interaction of the collection device 19, vacuum mechanism 21, and battery 23 are such that the pest control device 1 will operate properly, as described above.

Figure 2:
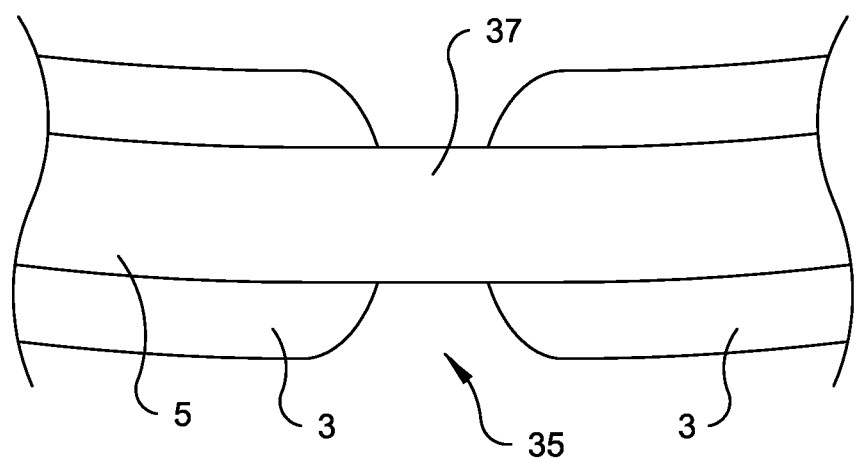
FIG. 2 shows a partial front view of an embodiment of the present invention.

FIG. 2 shows an embodiment of the invention showing a gap 35 on the front of the main body 3 which contains a soft connector 37. If the main body 3 is made of hard plastic, this may be uncomfortable for someone bending down so the soft connector 37 can be a portion of the belt 5 or can connect with the belt and be made of cloth or elastic for increased comfort. The belt is typically made of strong fabric or fiber and the soft connector 37 can be made of softer fabric which is strong enough to hold the main body 3 together while being more comfortable when the user bends down. It may even be round as opposed to sheet-like in shape, depending on ergonomics. The soft connector 37 can be attached to the main body 3 and may be adjustable to tighten or loosen with the use of a buckle or other ways. The soft connector 37 can extend up to ⅓ around the circumference of the pest control device and still leave enough room for the various implements to be attached to the main body 3 while being comfortable to wear. In other words, the gap 35 can extend up to ⅓ around the circumference of the pest control device 1. For example, the gap 35 can extend from ¼ to ⅓, or ¹⁄₁₀ to ⅓ around the circumference of the pest control device 1.

FIGS. 3a, 3b, 3d, and 3e show various adapters 39, 41, 43, 45 that can be connected with the nozzle 31. The adapters can be more generically referred to as implements since they are implements that can be used for pest control. The adapters can each have the appropriate shape to suction pests as needed or they can be an adapter to different nozzles to effectuate particular suctioning. Preferably, the adapters have the appropriate shape for proper suctioning and can be connected with the nozzle 11 and utilized without additional nozzles or other adapters. A connection device is configured to connect the various adapters 29, 41, 43, and 45 with the nozzle 31. For example, the adapters 29, 41, 43, and 45 may have a notch 49 that engages a pin 51 on the nozzle 11. The connection device would be the combination of the notch 49 and pin 51. Other ways to attach the adapters 29, 41, 43, and 45 to the nozzle 11 include having complementary threads on the outside of the nozzle 11 and the inside of the adapters 29, 41, 43, and 45 in order to screw the adapters 29, 41, 43, and 45 onto the nozzle 11. Any other ways to connect the adapters 29, 41, 43, and 45 to the nozzle 11, whether directly or indirectly, are deemed covered by the present disclosure. FIGS. 3c and 3f show circular and "flat" cross-sections with respect to adapters 29, 41, 43, and 45.

Figure 3A:
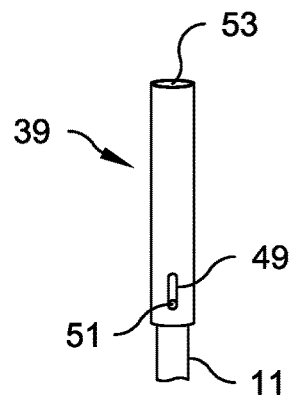
FIGS. 3a, 3b, 3d, and 3e show side views of adapters according to the present invention.
Figure 3B:
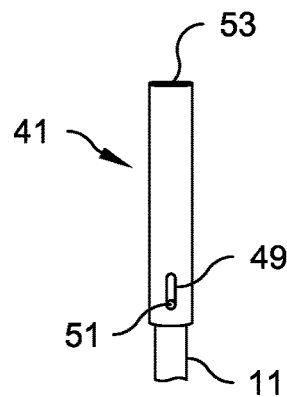
Figure 3C:
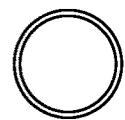
FIGS. 3c and 3f show top views of adapters according to the present invention.
Figure 3D:
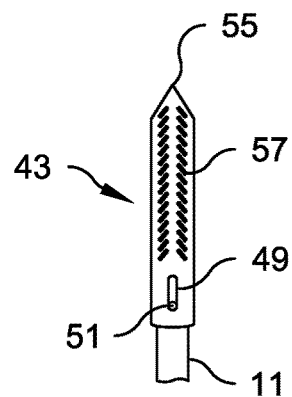
Figure 3E:
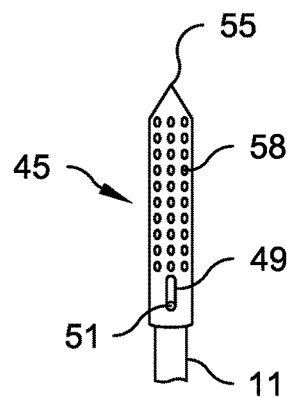
Figure 3F:
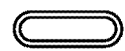

Adapter 39 at FIG. 3a has a circular cross-section (see FIG. 3c) perpendicular to the longitudinal direction of the adapter 39. Adapter 41 at FIG. 3(b) has a "flat" cross-section (see FIG. 3f) perpendicular to the longitudinal direction of the adapter 41. Adapters 43 and 45 at FIGS. 3d and 3e can have a circular or a "flat" cross-section. The tips of adapters 43 and 45 can be pointed as shown or can be flat. Adapters 39 and 41 have openings 53 at the front ends thereof through which pests can be suctioned. Adapters 43 and 45 have ends 55 which are completely or partially closed.

Adapter 39 is intended to suction air to dislodge pests, eggs, and other unwanted materials from floors, crevices, attics, underneath appliances, etc. The term "unwanted materials" as used in the present application shall include dead pests, live pests, pest pieces, nest pieces, debris, molt, droppings (fecal matter), food sources, harborage (nesting debris), arachnids such as spiders, insects such as ants, cockroaches, bedbugs, fleas, bees, wasps, and yellow jackets, other biting and stinging pests, and debris associated with pest infestation, as well as dust and rodent droppings (including mice and rats), and bat droppings, and contents of rodent bait stations that need to be cleaned out, such as droppings. In some cases, an aperture or crevice to be vacuumed may have an elongated shape such that a "flat" cross-section is more appropriate so in this case, adapter 41 can be used since it has a "flat" cross-section. The adapters 29, 41, 43, and 45 can be made of metal or hard plastic. In some cases, something more flexible may be desired so they can be made of flexible plastic. Also, sometimes it is difficult to maneuver straight or even flexible objects in an aperture so if the suctioning is only on the tip of an elongated device, this may make it difficult to property suction all that is desired. Accordingly, adapter 43 has slits 57 which extend from an outside to an inside of adapter 43 in order to suction pests, etc. and are positioned in adapter 43 in areas that are not just the tip of adapter 43. Adapter 43 may or may not have slits on the end 55. Adapter 45 is similar to adapter 43 in that it has holes 58 instead of slits on its side and may or may not have holes 58 on the end 55. Adapters 43 and 45 are able to suction a broader area than just if the suctioning were solely done via an end 55. A plurality of slits 57 and holes 58 in adapters 43 and 45 (as well as other adapters) can be placed near the end 55 or closer to the nozzle 11. Preferably, at least some of the slits 57 and holes 58 are near the end 55 to suction deeper into a crevice or opening. The number of slits 57 and holes 58 can be varied based on how powerful a suction needs to be since the more slits 57 and holes 58 present, the less suction there is in each aperture. Slits 57 and holes 58 can be generically referred to as apertures, and other shapes besides slits 57 and holes 58 can also be identified as apertures. Preferably, the apertures (e.g., slits 57 and holes 58) are positioned around the adapters 43 and 55, as appropriate, to suction in a 360 degree area. The slits 57 and holes 58 can be made of different sizes to accommodate different sizes of pests.

Figure 4A:
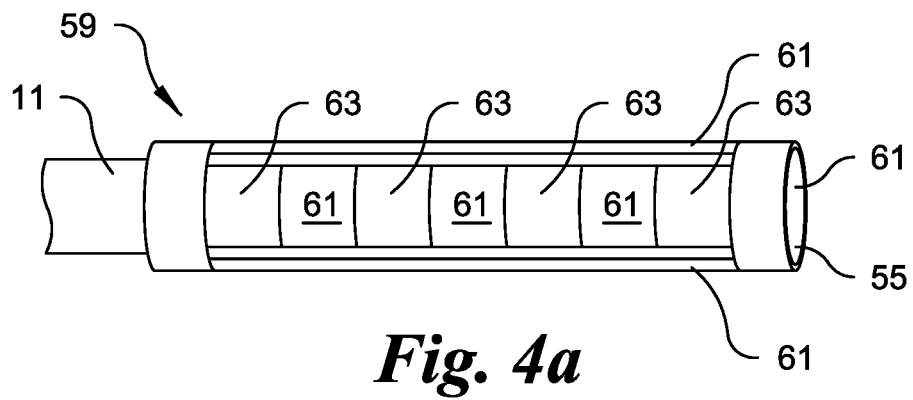
FIGS. 4a, 4d, and 4e show side views of additional adapters according to the present invention.
Figure 4B:
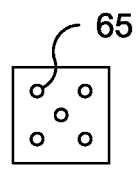
FIGS. 4b and 4c show schematics of parts of adapters according to the present invention.
Figure 4C:
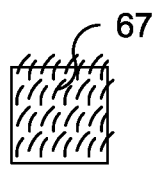
Figure 4D:
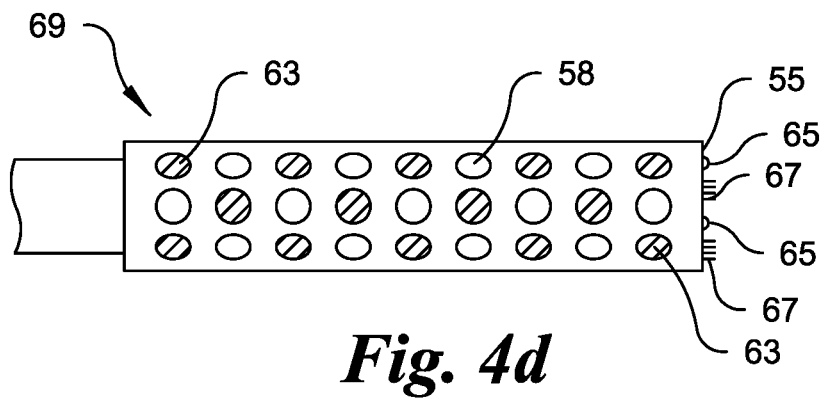
Figure 4E:
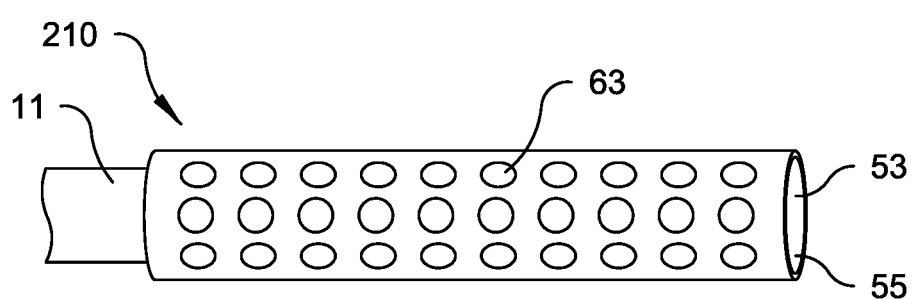

In many cases, pest eggs and excrement and other unwanted materials may be adhered to surfaces since pests sometimes stick their eggs to surfaces rather than leaving them loose. Accordingly, it is helpful to dislodge unwanted materials prior to or concurrently to suctioning for improved removal. It is for this purpose that adapter 59 can be used (see FIG. 4a). Adapter 59 includes open portions 61 for suctioning which can be located on the periphery of adapter 59 as well as at the end 55. The end 55 can be closed. The pattern of open portions 61 shown at FIG. 4a can be varied. The adapter 59 can include rough portions 63, which can include small protrusions 65 or bristles 67 to dislodge eggs and other materials inside crevices. When the adapter 59 is inserted into a crack or crevice, it can be jiggled or rotated to scrape off eggs and other materials. If the vacuum turned on during insertion, these scraped off materials can be readily suctioned. FIGS. 4b and 4c show the protrusions 65 and bristles 67, respectively. The protrusions 65 can be made of metal, rubber, or plastic, and are basically little bumps to increase friction. Preferably, they are made of plastic or rubber to avoid damaging the crevice into which they are inserted. Any appropriate size can be used. However, preferably, the protrusions 65 have a height of 0.5 to 5 millimeters. Preferably, the height is 0.5 to 3 millimeters. Alternatively, the protrusions 65 or the bristles 67 can be as fine as sand paper and extend to 5 or 10 millimeters, as appropriate. The bristles can extend up to 10 millimeters in length. Preferably, the bristles are 2-6 millimeters in length. The protrusions 65 and bristles 67 can be continuous such as sand paper or they can be discontinuous such as shown at FIGS. 4b and 4c. A single adapter 59 can include a combination of protrusions 65 and bristles 67, or just one or the other. It is noted that adapters such as shown at FIG. 3 can also include protrusions and/or bristles. For example, some of the places where there are slits 57 and holes 58 at FIG. 3 can include protrusions 65 and/or bristles 67 in lieu of and/or in addition to some of the apertures 57, 58. FIG. 4(d) shows adapter 69 with a combination of rough portions 63 (such as protrusions 65 or bristles 67) which are shown with shading and holes 58 not shown in shading. The end portion 55 can be closed or open and it can include rough portions 63 on its surface if closed or it can include them on the perimeter of an opening if it's open. For example, FIG. 4(e) shows adapter 210 with rough portions 63 which can be protrusions 65 and/or bristles 67 as well as an opening 53.

Figure 5A:
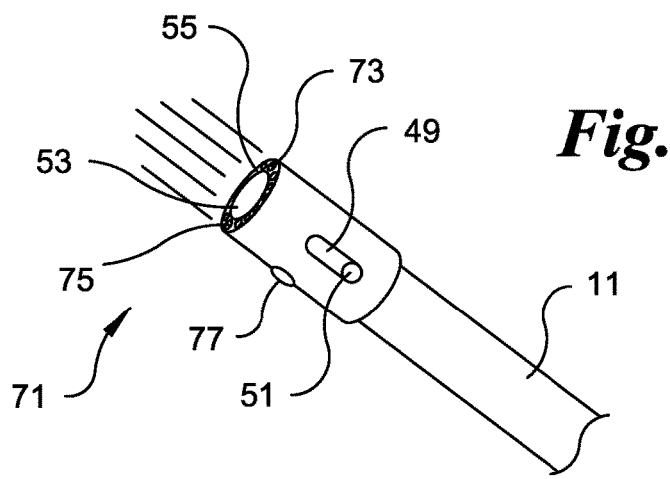
FIGS. 5a, 5c, 5d, and 5e show side views of adapters with illumination sources according to the present invention.

Often, when technicians are effectuating pest control, this requires going to locations where there is little light. For example, underneath appliances, or in crevices, or behind counters are locations which may require light. The present invention can include a light attached to the nozzle 11. This is shown at FIG. 5. FIG. 5a shows the nozzle 11, notch 49, pin 51, and light device 71 which is connected with the nozzle 11 in a same or similar way as, for example, adapter 39. The way the various adapters (with and without lights) are connected to the nozzle 11 can be the same or different and this description is deemed to disclose connecting any adapter or implement in FIGS. 3, 4, and 5 in any way disclosed in any disclosure pertaining to FIGS. 3, 4, and 5 or any known way of attaching adapters or implements, such as using a notch and pin or by screwing in, as mentioned above. The light device 71 includes an LED light 73 which consists of a plurality of LED devices 75 which are arranged on an end 55 of light device 71. The cross-section of the light device 71 can be circular or "flat", as shown at FIGS. 3c and 3f. The light device 71 allows for simultaneous illumination with the LED light while vacuuming pests and other unwanted materials since the plurality of LED devices are positioned around the opening 53 of the light device 71 through which suctioning can occur. If LED devices 75 are arranged on an end 55 of light device 71, once the light device 71 is inserted into a crack or crevice, this may stop the technician from being able to see since the light would be blocked off. The present invention can include an additional light further back along the nozzle 11 of the pest control device 1 to continue to provide light that is visible to the user.

Figure 5B:
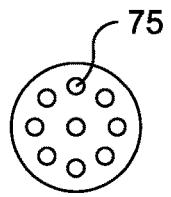
FIG. 5b shows a top view of an adapter with illumination according to the present invention.

The advantage of the illumination at the very tip of the light device 71 is that it can be placed on any of the adapters 39, 41, 57, and 69 since it does not get in the way of the vacuuming. It can be placed either on a perimeter of the front of the adapters around an orifice, or if the adapter has a closed or partially closed end, it can be placed on any part of the end surface of the adapters. FIG. 5b shows a top end of a closed adapter, such as a version of adapters 57, 58, and 69, with a plurality of LED devices 75. Other lights can also be used and this technology is not limited to LED devices. The LED devices 75 or other lighting can be powered by a cable which is electrically connected to the LED devices 75 and to the battery pack 23 or another battery. For example, a battery can be placed inside the light device 71 which is connected to the LED devices 75. The light device 71 can have an on/off switch 77 for the light or the light can be activated via blue tooth or other remote technology and the on/off switch can be located on the nozzle 11 proximate to the on/off button 15 or elsewhere. If the light device is powered by a cable that reaches the main body 3, then an on/off switch can be operably connected to the cable and placed anywhere. Remote lighting such as blue tooth lighting uses blue tooth technology to connect one device with another to control when the lights turn on and when they turn off. Blue tooth lights are known in the art and do not need to be explained in detail. Although an on/off switch is a practical way to turn the light device 71 on and off, both the vacuum itself and the light device 71 can be voice activated via a smart phone or by having a microphone on the main body 3 which can discern voice commands to turn the vacuum or light on or off in order to free the technician from having to reposition his hands during a job of pest control. For example, if the technician is laying horizontally and suctioning an aperture that is difficult to get to, voice commands to use the vacuum and the light can be very helpful. The vacuum and the light can also be coupled such that they turn on and off at the same time. Voice command technology and smart phones are known in the art and further explanation is not needed in this disclosure.

While the lights used in the present invention can be powerful, because they are small, they do not need much battery space. Preferably, the battery or batteries 81 (see FIG. 5c) can be rechargeable or not rechargeable. Additionally, due to small size and power needed, such batteries 81 can be charged wirelessly. This technology, which can use inductive or magnetic fields, is known in the art and further explanation is not needed. Wireless charging can allow charging without having to disassemble the device. For example, a plurality of LED devices 75 can each have its own tiny battery or one battery can power 2-5 LED devices 75 instead of one battery powering all the LED devices 75. This allows a smaller footprint for batteries to avoid obstructing the interior of adapters from proper suctioning of pests. The shape of the adapters can be modified to house batteries for the lights, such as LEDs to reduce the interference by the batteries on the flow of vacuumed air and unwanted materials through the adapters.

Figure 5C:
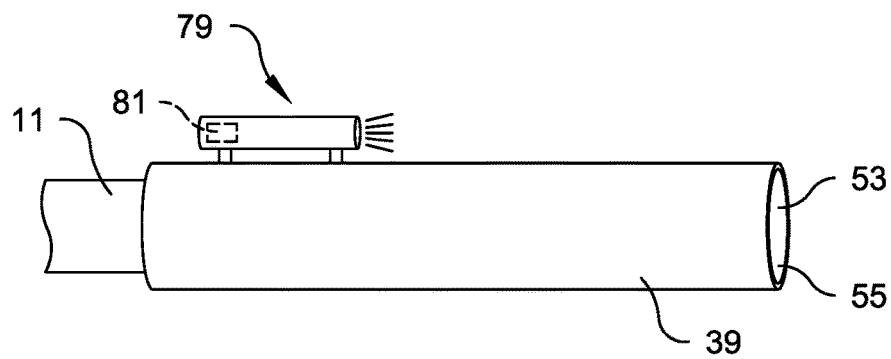

In some cases, a more powerful light source is desired and a separate light source 79 can be utilized, as shown at FIG. 5c, which provides more space for battery power and a powerful light. The light source 79 can use LED technology or it can be incandescent or compact fluorescent or any other lighting technology known. The light source 79 can be powered by an internal battery 81 (rechargeable or not) or by a cable to another battery or the battery 23 for the vacuum. The light source 79 can be all the way on the end 55 of the adapter 39. It can also be offset from the end 55 of the adapter 39. Preferably, this light source 79 will be offset from the end 55 of adapter 39 in order to avoid the light source 79 getting in the way of using the adapter 39 by inserting it into an opening or crevice since light source 79 can keep the adapter 39 from penetrating small crevices. The light source 79 can be permanently attached to adapter 39 or it can be removable, such as with the use of loop and hook devices (such as Velcro branded products), or by a snap connection, or by the use of screws. Although adapter 39 is shown at FIG. 5c, any adapter, such as adapters 41, 47, and 69 can be operably connected with the light source 79.

Figure 5D:
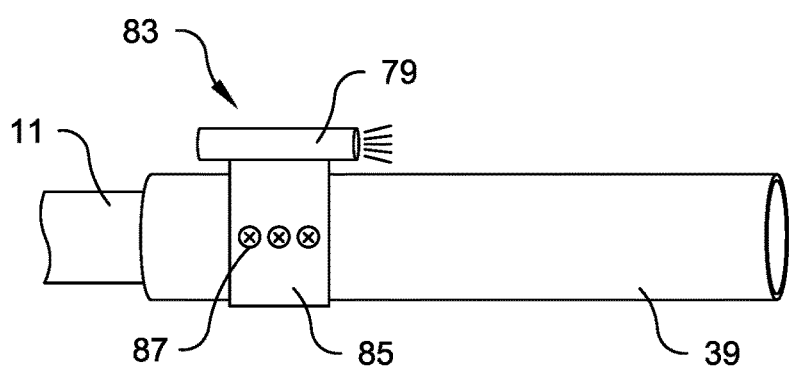
Figure 5E:
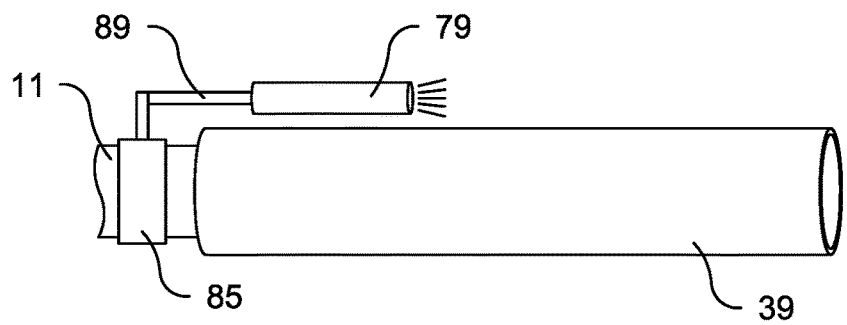

In some cases, it can be helpful to have illumination which is repositionable. For example, FIG. 5d shows a repositionable illumination device 83, in which repositioning mechanism 85 is shown connected with the light source 79. A repositioning mechanism can be a device which is configured to slide longitudinally along the adapter 39 and/or the nozzle 11, and even from the nozzle 11 to the adapter 39 and back. In one embodiment, the repositioning mechanism 85 (which can be a slide) is made of plastic and has flat head screws 87 at three positions where the heads face radially outward and the threaded portions extend radially inward so that when the heads are turned, the screws can tighten around the adapter 39 or the nozzle 11 depending on the location of the repositioning mechanism 85. Other types of screws can be used and the slide can be made of other materials such as metal. The number of screws can vary. Other attachment mechanisms can be used too such as releasable clamps, rollers, etc. and can be used in a slidable illumination device 83 or a device which can be easily removed and repositioned without necessarily sliding. The repositioning mechanism 85 can also be spaced from the light source 79 via a connector 89 as shown at FIG. 5e. The connector 89 can be made of metal or plastic and can be light weight for comfort. For example, the connector 89 can be made of aluminum tubing which is attached to the repositioning mechanism 85 as well as the light source 79. The connector 89 can be directly connected to the nozzle 11 or to a portion of the adapter 39 instead of being connected to a repositioning mechanism. If a repositioning mechanism is used, the repositioning mechanism 85 can remain around the nozzle 11 even though the light source 79 is adjacent to the adapter 39. As stated above, adapter 39 is being used as an example and the other adapters mentioned can be used as well.

Figure 6A:
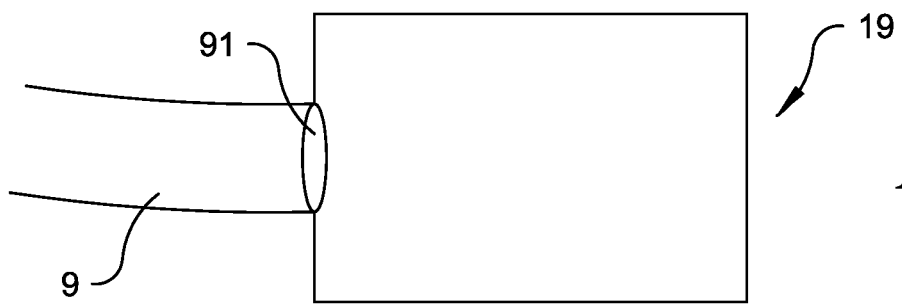
FIGS. 6a-6c show side views of a collection device according to the present invention.

The unwanted materials (pests, excrement, eggs, etc.) which are suctioned by the vacuum need to be stored somewhere for proper disposal, such as the collection device 19. The collection device 19 can contain or be a standard HEPA filter in order to trap larger pieces such as insects and smaller ones such as dried out excrement which has turned into dust. Because vacuuming can disturb settled particles, it is important to have a HEPA filter that can trap even small particles. If convenience is of utmost importance, the collection device 19 can be a replaceable HEPA filter that is used and once it's full, it can be removed from the main body 3 and discarded, just like any filter on any vacuum cleaner as is well known in the art. Also, as shown at FIG. 6a, the hose 9 can be operably connected to a sealing mechanism 91 which allows movement of solid particles from the hose 9 into the collection device 19 and not the other way around. A flap 91 that is pivotably connected to the hose 9 and/or the collection device 19 in which the flap can only open from a resting position by pivoting towards the collection device 19 when the pressure is applied by the vacuum is an option. In this case the bugs and other unwanted material would not be able to exit the collection device 19 since the flap 91 would be closed unless vacuum is applied in which case the bugs, etc. would not be able to exit the collection device back into the hose 9 since there would be vacuum pulling them into collection device 19. It is important for the seal between the sealing mechanism 91 and the collection device 19 to remain once the collection device 19 is removed for disposal.

Figure 6B:
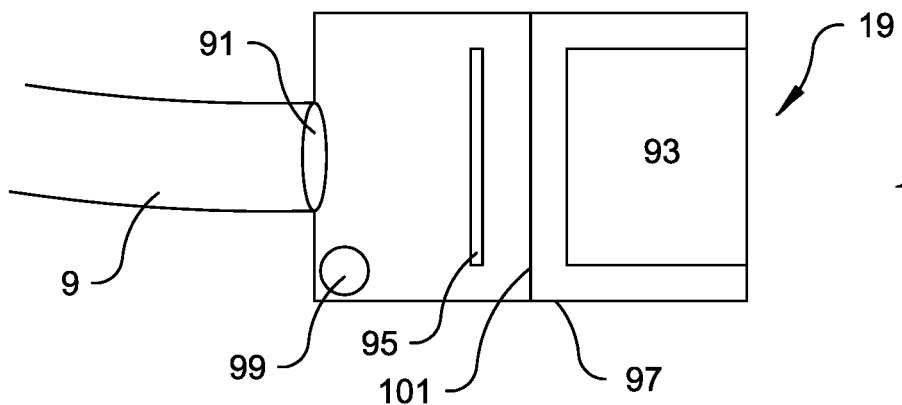

The collection device 19 can have space for the small particles as well as the larger objects such as insects. As shown at FIG. 6b, the collection device 19 can have space between the sealing mechanism 91 and the HEPA filter 93 in which there is one or more intervening barriers 95. A HEPA filter according to the present invention is a filter which is capable of capturing 99 percent of particles that are 2 microns or larger which flow to it.

By having space for large particles and small particles, the flow of air with bugs and other material can strike the barrier 95 and the bugs will drop down and the lighter particles can continue to flow into the HEPA filter 93. This can help the HEPA filter have longer life by not being clogged or obstructed by larger particles. Optionally, the collection device 19 can contain a net 101 or other entrapment device which only permits small particles (up to 1 mm, such as up to 0.001 mm) to pass through so big pieces would not pass through and clog the HEPA filter 93.

It is possible to have a pressure sensor or a flow meter operably connected with the hose 9 or the collection device 19 to determine whether the collection device 19 is getting full and needs to be replaced. If getting full (flowrate or pressure is less than 50% (such as 30-50%) with respect to a new collection device 19), the user can then get a visual or audial signal (or both) to indicate that the collection device 19 needs to be replaced or cleaned out. The visual signal can be a light and the audial signal can be a beep.

Figure 6C:
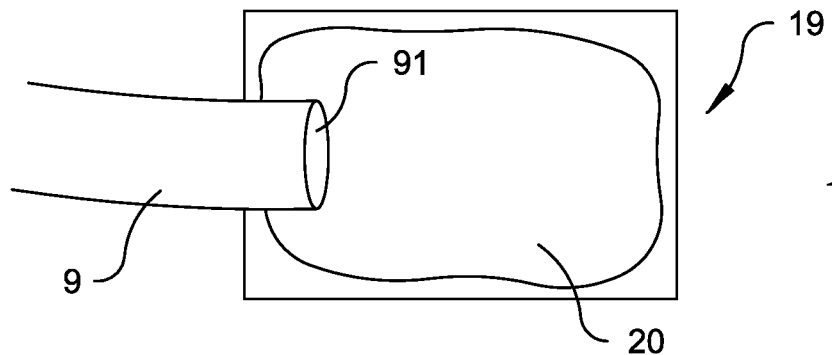

Collection device 19 can have an outer container 97 which is water proof and the collection device 19 can have an opening 99 into which water (with or without soap or other material) can be added to drown the pests and to clean the collection device 19. The opening 99 can have two potential structures. It can have an outer cap that fully closes the collection device 19 in a water tight manner. This would be used during treatment for pest control. It can have an inner cap that has a plurality of openings such that it can be loaded with water without any pests flying out through the inner cap. It can also be opened all the way by removing the inner and outer caps, such as when the collection device is unloaded or cleaned. The user can easily attach the inner cap and/or the outer cap, or remove them both. The opening 99 can be operably connectable to a disposal system (not shown) where the water with the bugs and other undesirable matter can be dumped out of the opening 99 into the disposal system. This can help reduce costs by extending the life of the collection device 19 before it has to be replaced. It is possible for a portion of the collection device 19 (such as the left side of the collection device 19 at FIG. 6b) to be separable from the portion that contains the HEPA filter 93. Thus, the left portion can then be washed and re-used if it's not desirable for the HEPA filter to get wet. FIG. 6c shows the hose 9 extending into the collection device 19 and the flap 91 being inside the collection device 19. It is possible to have a bag or filter 20 located inside the collection device 19, as shown at FIG. 6c. A HEPA filter can be contained inside bag or filter 20 or the HEPA filter can be located inside collection device 19 and outside bag or filter 20. For example, the HEPA filter can be connected to the bag or filter 20 and be downstream of the flow of air from the bag 20 so that bag 20 captures pests and other larger unwanted materials and the HEPA filter can capture the smaller unwanted materials. Another disposal method includes a heating chamber killing live insects which can enable easy disposal in approved disposal areas. Light wave killing techniques are also envisioned as an option.

Figure 7D:
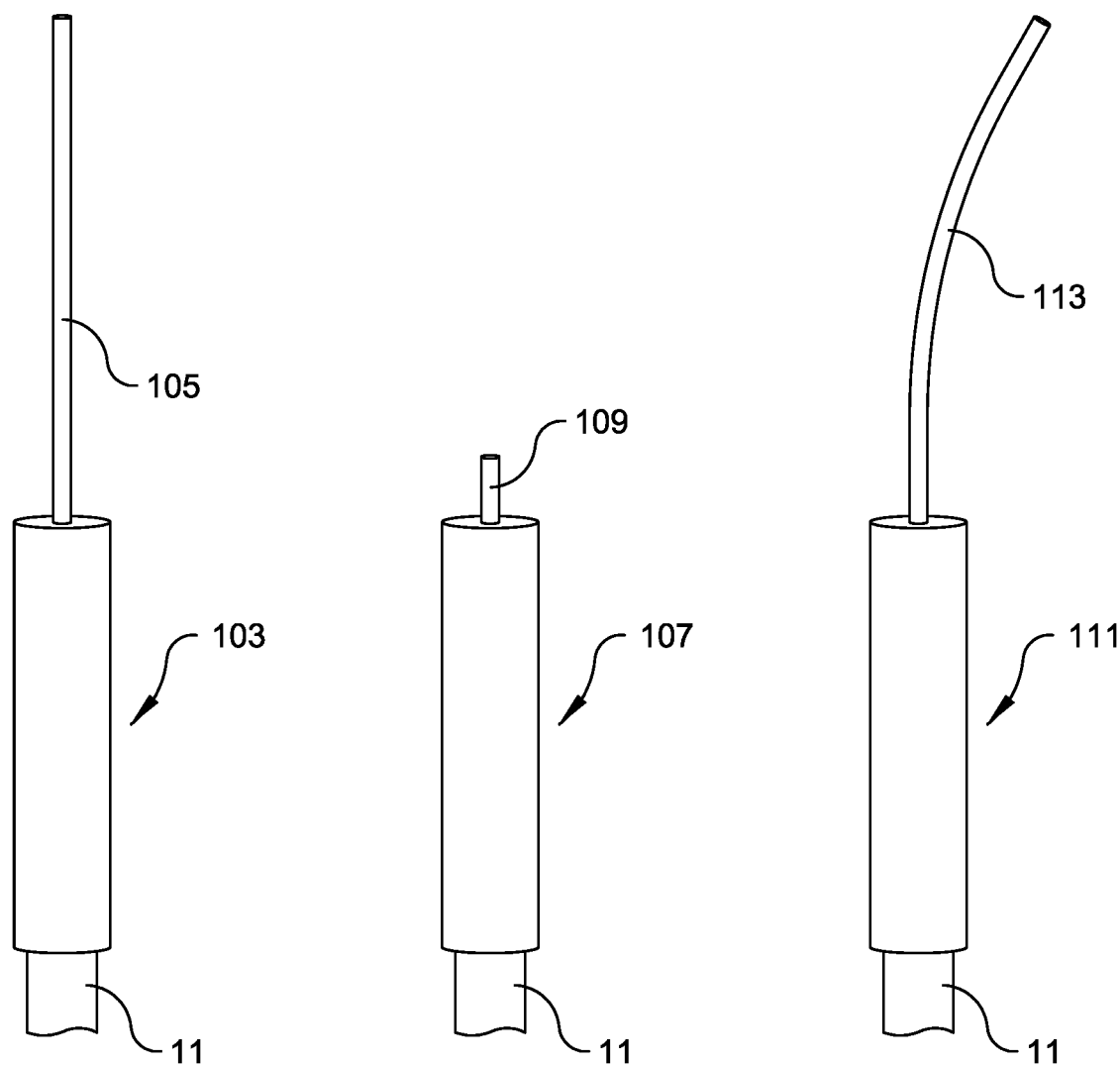
Figure 7D:
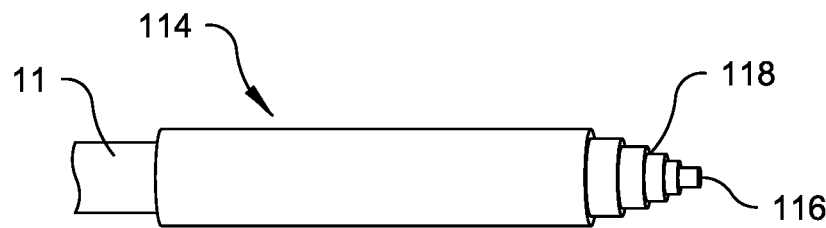

The adapters which are used to access difficult to reach spaces can have various shapes and sizes to accommodate different openings. FIG. 7 shows various adapters having various nozzles with different shapes. FIG. 7a shows adapter 103 having a long nozzle 105. The inner cross-section of long nozzle 105 can have a length of between ⅛ inches and half an inch. In the present disclosure, the inner cross section or the cross section of an elongated object means the cross section perpendicular to the longitudinal direction of that object. The length of long nozzle 105 is from 2-10 inches. FIG. 7b shows adapter 107 having a short nozzle 109. The inner cross-section of short nozzle 109 can have a length of between ⅛ inches and half an inch. The length of short nozzle 109 is from half an inch to 2 inches. FIG. 7c shows adapter 111 having a curved nozzle 113. The inner cross-section of curved nozzle 113 can have a length of between ⅛ inches and half an inch. The length of curved nozzle 113 is from 2-10 inches. FIG. 7d shows a telescopic wand or nozzle 114 which is used as an adapter which is connected to nozzle 11. The adapter 114 has an opening 116 for suction connected to adapter 114. The telescopic wand or nozzle 114 can have slidable concentric rings 118 of decreasing size towards the opening 116 that allow the adapter 114 to be telescopic.

The adapters 39, 41, 57, 58, 59, 69, 71, 103, 107, 111, and 114 can be stored in the implement container 29. There are other implements which can also be stored that are useful for a pest control professional. For example, FIG. 8 shows various implements that are useful and which can also be stored in the implement container 29. FIG. 8a shows a fluid blaster/dislodger 115 which contains adapter 117 with nozzle 119. Adapter 117 is fluidly connected with a compressed fluid source 121, which can be compressed CO2 or compressed air or even pressurized water or another solvent such as methanol or ethanol or isopropanol. Preferably, adapter 117 is a CO2 cylinder which would be screwed onto the adapter 117 to blow debris/insects out of the cracks & crevices.

Since this is not a vacuum into which particles are suctioned, nozzle 119 can be smaller than other nozzles since it would not be clogged by pests and other particles. The cross-sectional length (perpendicular to a longitudinal direction) of nozzle 119 can be between 1-5 millimeters. The adapter 117 can be connected to the compressed fluid source 121 by any known ways such as pin 125 and slit 123 connectors, or the use of threads for screwing, etc. Preferably, the compressed fluid source 121 is activated with the push of a button 127 which can be located on the adapter 119 or the compressed fluid source 121. This can activate a valve to allow compressed fluid to enter the adapter 117 at high pressure and escape through the nozzle 119. The compressed fluid source 121 is removable when expended.

Fluid blaster 115 is useful to dislodge debris or insects or other unwanted materials from cracks and crevices. Sometimes, unwanted materials are not completely vacuumed since they are struck or the crack or aperture is too small for the vacuum adapters, or the orientation of the vacuum adapters (e.g., nozzles) is not appropriate for full removal of pests and other unwanted materials. In these situations, the fluid blaster 115 can be used to blast the crack or crevice and push out the debris, insects, or other unwanted materials into a location where they can be vacuumed (such as outside of the crack or crevice or elsewhere within the crack or cervice that is more accessible). Moreover, the fluid blaster 115 can have a smaller nozzle than the vacuum adapters (since there are no solids traversing the fluid blaster 115 nozzle) and therefore create a narrow and powerful jet of fluid for removal of pests and other unwanted materials. The fluid blaster 115 may create a jet with a higher pressure per unit area than is generated by the vacuum.

It is also possible to attach adapter 117 (or a variation thereof) to the nozzle 11 of the hose 9 and to run the vacuum backwards to create a jet of air that will exit nozzle 119, making the need for a compressed fluid source 121 which is separate from the vacuum mechanism 21 unnecessary. Adapting the vacuum mechanism 21 to run in reverse is known in the art and no further details are needed. If the vacuum were to be run in reverse, the structure of sealing mechanism 91 may need to be changed. For example, if sealing mechanism 91 is a flap 91 that only opens to allow objects into the collection device 19, this can create a blockage if the vacuum is run backwards and the flap 91 is solid, such as solid metal or plastic. One potential option to address this is for the flap 91 to be made of a filter and/or porous material that allows air through it but not pests and other unwanted material. Another option is to have a separate connection between the hose 9 and the vacuum mechanism 21 which does not go through the collection device 19 to avoid the release of unwanted materials. A plastic air tube can be used to connect the hose 9 and the vacuum mechanism 21.

Other implements that can be included in the implement container 29 include a small caulk container 204 with a nozzle 206 to seal cracks once they've been cleared of pests, etc. Another implement can be a small spray bottle 120 of isopropyl alcohol which can be used to clean infested surfaces and remove/interfere with pheromones that attract pests. The spray bottles can have short or long nozzles. Essential oils can also be used since some essential oils can harm insects and arachnids and other pests without being poisonous. Thus, a bottle such as the one identified as bottle 120 can include one or more essential oils instead of isopropyl alcohol. The essential oils are preferably dissolved in water. Some of the essential oils that can be used include citrus oils and mint oils, though others can be used too.

It is noted that the fluid blaster 119 can also include a compressed fluid source 121 with isopropyl alcohol which can be used instead of or in addition to the isopropyl spray bottle. Implements such as isopropyl alcohol which are liquid can be sprayed with a spray bottle. While aerosol cans can be used, they are more dangerous and easier to activate inadvertently so spray bottles are preferred and aerosol cans can be avoided. Except for the compressed fluid source 121, it is preferred that the implements do not contain liquids which are under pressure, that is, they are at atmospheric pressure. Pressure of up to 1.05 atmospheres should still be acceptable. Even if the compressed fluid source 121 is under pressure, that would be the only implement under pressure. There would not be additional canisters of compressed fluid necessary. Also, since individual implements are found in the implement container 29, they are easily accessible to the user. In fact, even if there is more than one liquid implement such as isopropyl alcohol and essential oils, they can separately be taken from the implement container 29 and sprayed where needed and there is no need for a common way (such as a multipurpose hose) to spray more than one of these implements. The implement container 29 can include a micro LED camera which can be put at the tip of any of the implements disclosed in this description and which can wirelessly show images on a phone, tablet, or computer through the use of Bluetooth technology or other wireless technology. A wired connection can also be used. The micro LED camera can also be a camera on the tip of a wire that can be inserted deep into a crevice by putting more of the wire into the crevice.

FIG. 8b shows a spray bottle 120 of isopropyl alcohol with a sprayer 122 at the top and a cap 202 and a lid 200. FIG. 8c shows a tube 204 of caulk (i.e., which contains caulk) with a nozzle 206 and a cap 208. The spray bottle 120 of isopropyl alcohol contains isopropyl alcohol. However, instead of isopropyl alcohol, it can contain an essential oil or oils.

Other implements which can be included in the implement container 29 (or, if full, an additional implement container 29 attached to the main body 3) are traps, such as traps for monitoring and controlling rodents since they may be too big to be vacuumed. Traps can include traps for rodents and insects and spiders and other pests. Examples of traps include glue/sticky boards (for rodents), rodent snap traps, baits for rodents and insects and other pests which are harmful to rodents and insects and other pests, and dust rodenticides/insecticides.

Figure 9A:
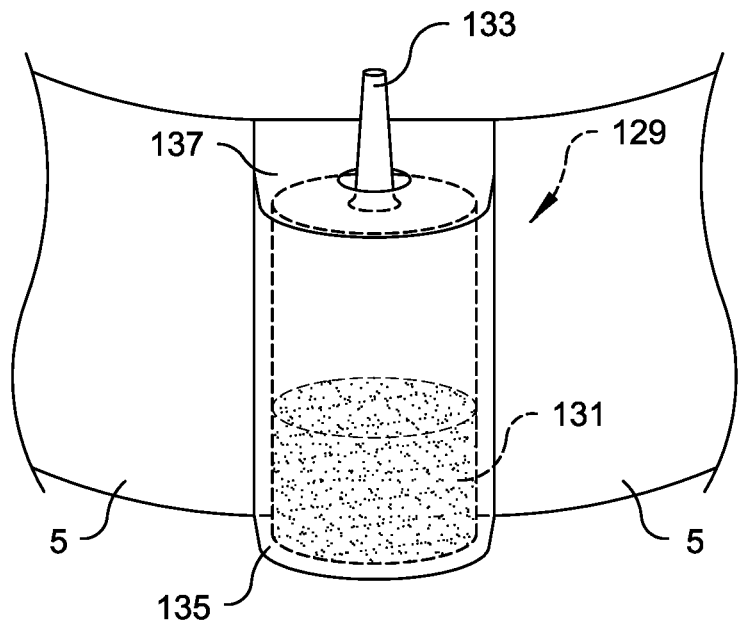
FIGS. 9a and 9b show side views of a duster according to the present invention.
Figure 9B:
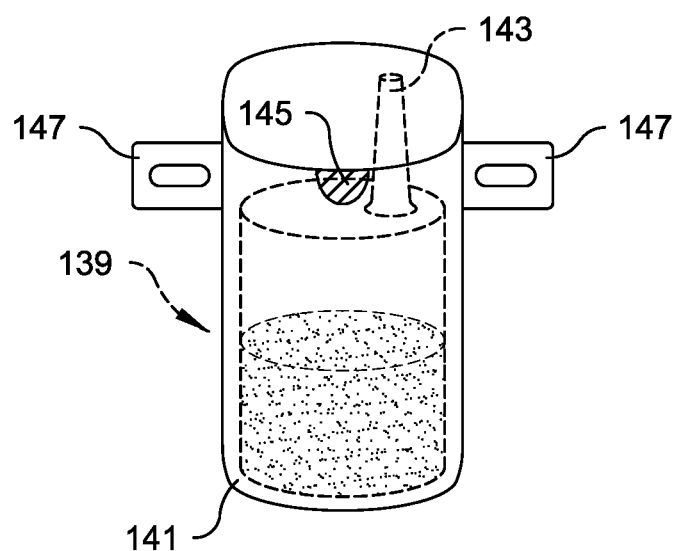

Another implement which can be included as part of the pest control device is a hand duster 129 such as one shown in FIG. 9a. Hand dusters contain a powder 131 which is harmful to pests, and when the hand duster 129 is squeezed, the powder is blown through a duster nozzle 133 and into crevices and other hard to reach spaces. The powder 131 can be made of diatomaceous earth or boric acid, which are harmful to pests. This is a useful tool for pest control and in the present invention, if the hand duster 129 is placed directly on belt 5 without any protection, the user can bump into things and have it accidentally be pressed which may cause a discharge of powder. The present invention envisions the possibility of attaching, in a detachable manner, such as with hook and loop attachment mechanisms (such as those sold under the Velcro brand), or a snap attachment, or other ways to attach and detach, an unprotected hand duster 129 onto belt 5 with a lid, cap, or seal to avoid accidental discharge. It is preferred, however, to protect the hand duster 129 from discharge. For example, the hand duster 129 can be substantially or completely enclosed in a rigid outer structure or casing 135, such as a hard case. This will prevent the hand duster 129 from being squeezed since it is protected by the rigid outer structure. FIG. 9a shows the duster 129 substantially enclosed by casing 135 since only the nozzle 133 protrudes outside of the casing 135. FIG. 9b shows the duster completely enclosed by casing 135. The rigid outer structure can have removable lid 137 which can be removed by the user of the device and then the user can pull out the hand duster 129. Since the most crucial portion to protect is the sides of the duster 129, it is possible to not have a lid 137 and for the duster 129 to be exposed at the top. The actual location of the duster 129 can be anywhere on the belt 5. For example, in FIG. 1, it could be included between the collection device 19 and the front portions 31, including being on the front portions 31. Preferably, the collection device 19 would not be on the front portions 31 since it may make it less comfortable for a user to bend down with a hard case in front of them.

FIG. 9b shows a different embodiment for having a hand duster 139 on the pest control device 1. The hand duster 139 is completely enclosed by the cover 141, including the nozzle 143. The cover 141 may be closed with hook and loop fasteners 145 (such as those sold under the Velcro brand). Attachment devices 147 can each be part of a slot fastener or twist lock fastener, or can be otherwise attached to the belt 5 of the main body 3 in known ways.

The powder 131 inside of hand dusters 129, 139 can be of different types. For example, it may be an insecticide or a rodenticide. Accordingly, the rigid outer structures 135, 141 can include more than one hand duster 129, 139 inside of it.

For ergonomic reasons, when an object such as collection device 19, vacuum mechanism 21, battery 23, implement container 29, and rigid outer structures 135, 141 is operably connected to the main body 3, the height of such object should not be more than double than the height of the main body 3 at the location where the object is connected. Preferably, the object is no more than 1.5 times the height of the main body 3, and more preferably, the object is no taller than the main body 3 where attached. Objects which are more compact are more comfortable and less likely to injure an operator while in use.

The present invention is also directed to a method or process of effectuating pest control. When a pest control technician goes to a home or other location with pest infestation, it is important for the pest control technician to identify the situation by asking the person at the property for information on the issues. The pest control technician can then select implements for the pest control device 1 and put them in the implement container 19. Any of the implements can be selected. The pest control technician can also determine if the hand duster 129 will be needed since this gets put on a separate rigid container 135, 141 that is then attached to the pest control device. The technician can then put on the pest control device 1.

The technician will most likely need a light since pests such as insects and rodents do not usually set up nests in the middle of lit rooms. They like dark, secluded places with moisture and food. It would be important for the technician to put in the implement container 19 a couple of different lighting options in order to have flexibility so one with the light at the very end of an adapter (see light device 71 at FIG. 5a as well as one with the light on a separate device (such as light source 79 at FIG. 5c) would be helpful. A slidable light would be appropriate too (see FIG. 5d).

Initially, the technician would need to evaluate the pest issues so using the light without the vacuum turned on could be useful. Once the issues are determined, then the cleanup would likely need the use of the light as well as the vacuum at the same time. Depending on the situation, different implements can be utilized. The technician would then vacuum the infested area. In the case of insects, the insects and their eggs and food sources and excrement, etc. can be suctioned. In the case of rodents, the food sources and excrement can be suctioned. Since rodents are too large to be suctioned in a vacuum, this would require traps or, potentially, poison. Once all the unwanted material is removed, the technician can decide whether to seal off any apertures through which pests can penetrate a location, such as by using the caulk. If the degree of infestation behind a wall is not known, a microcamera can be put behind the wall to survey the situation. The microcamera should either have some kind of light source or should have an infrared sensor to be able to appropriately show images in dark spaces. Different implements can be used to remove unwanted material from difficult locations. In the event that an infestation is far beyond an opening and if the opening will not be enlarged to avoid damage to a home, then the duster can be used since the dust particles can float around and spread out. The dust particles can also be spread by the pests themselves. Thus, much if not all of the unwanted material can be suctioned, and if there is a deep nest, it can be treated with the duster. The advantage is that if the nest is not too deep, no chemicals may be needed for treatment. Moreover, by using a vacuum, allergens and toxins and other material is removed from a dwelling or other location.

The method of the present invention includes utilizing any part of the pest control device as disclosed in this application, such as lighting a light, replacing the collection device 19 or parts thereof, cleaning the collection device 19, replacing the battery 23, using the fluid blaster 115 to clean out cracks and crevices, etc.

The isopropyl alcohol can be used to clean treated surfaces to avoid other pests from being attracted to that area from other areas. For example, if a home is next to vacant land, there may be a ready supply of pests to enter the home, so the isopropyl alcohol can be used to erase the traces of pests to avoid attracting more pests.

The method of the present invention allows the pest control technician to carry a system of pest control and have both hands free for other tasks. For example, pest control technicians often carry clip boards and other items when they go into a residence and by having a pest control system attached as a belt around their waist allows them to easily carry other things due to having their hands free. This is especially convenient in situations where only one pest control technician visits a residence.

Figure 10A:
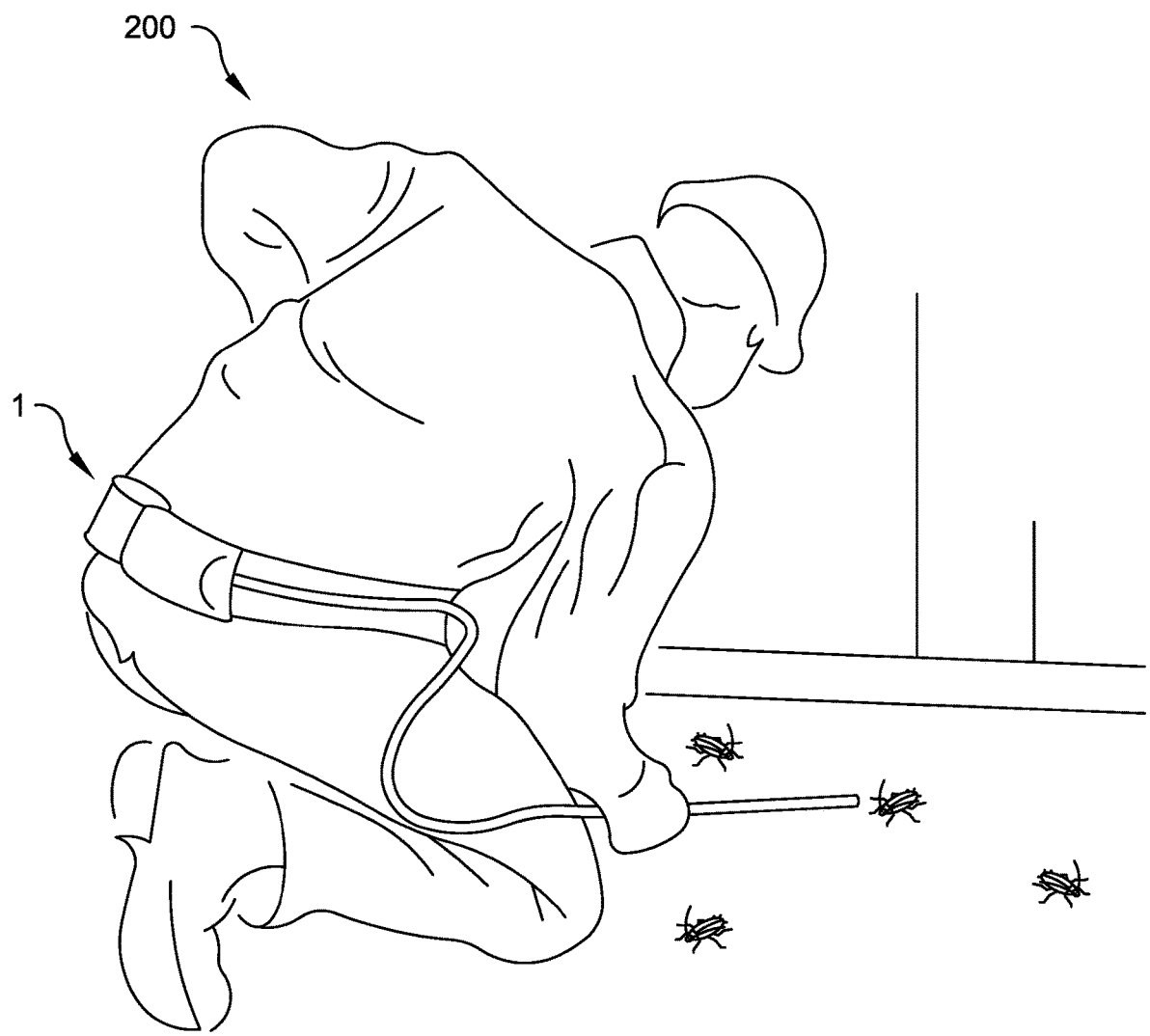
FIGS. 10a and 10b show side views of a use according to the present invention.
Figure 10B:
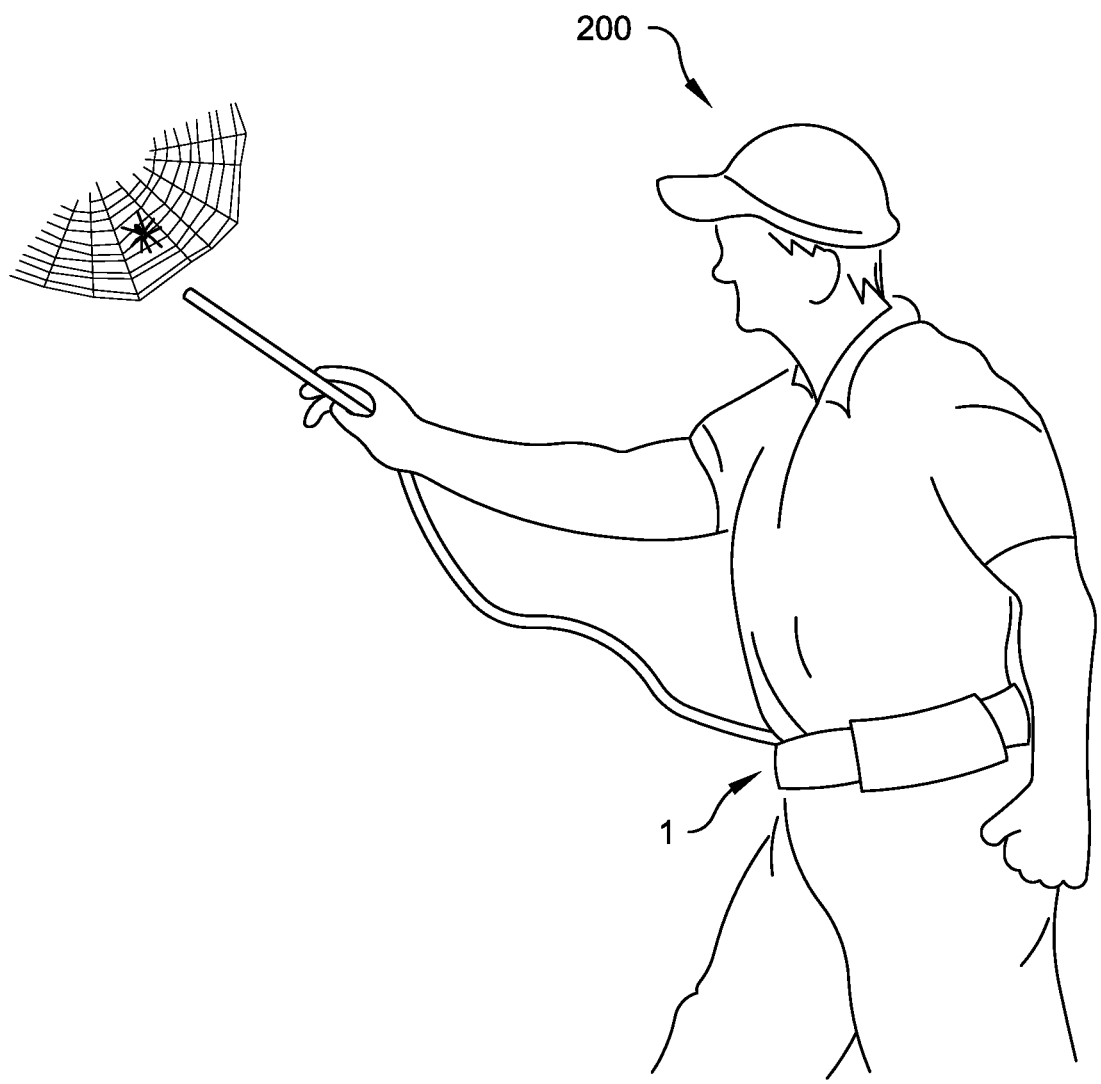

The method of the present invention allows for a comfortable and pragmatic use of the pest control system 1. As shown at FIGS. 10a and 10b, a user 200 such as a pest control technician 200 can wear the pest control device 1 to comfortably and reliably treat pests that are both on the ground as well as at a high locations. In fact, since the pest control system 1 can be carried hands-free, technicians 200 can climb ladders and other structures much easier than if equipment had to be carried which required the use of hands. The pest control device 1 can also be used to treat outside a residence to remove nests of pests and other unwanted materials that are in close proximity to a residence, including on the eaves of roofs.

Example 1

This Example 1 provides an example of the potential use of the pest control device of the present invention. In this example, a homeowner finds out that there is a cockroach infestation in the homeowner's home and a pest control technician is asked to ameliorate the situation. The pest control technician then determines which implements will be needed for the job and then puts the appropriate implements in the implement container and puts on the pest control device. The pest control technician determines that there are cockroaches living underneath the refrigerator as well as entering the kitchen underneath the kitchen sink behind a cracked wall. In this case, the pest control technician has various adapters, including some with the light concentric with the orifice through which the pests will be suctioned. In this case, the adapters will also include bristles to be able to brush adhered unwanted materials. The technician also includes caulk and a duster. The pest control technician chooses an adapter that has lighting on the end of the adapter as well as orifices on the longitudinal portion of the adapter as well as bristles on the longitudinal portion of the adapter. This will be useful for elimination of the pests inside the crack in the wall.

The technician turns on the light on the adapter since it's dark underneath the kitchen sink, and the light is very handy to find the crack and to insert the adapter into the crack in the wall. The technician then turns on the vacuum and begins to suction pests, eggs, etc. The technician rotates and moves the implement in and out of the crack in order to get different angles of treatment and also for the bristles to dislodge adhered eggs on side surfaces. All of this is done while the vacuum is on so that any dislodged particles are immediately suctioned by the device rather than falling further into the wall. Once all of the pests and eggs, etc. are suctioned off, the technician can use the duster to add a little bit of dust just in case there are remaining cockroaches in the crack. The present invention does not necessarily require the use of poison. However, even if the duster is used, the amount of dust needed is much less since many of the pests will be removed by the vacuum. Moreover, the dust can be harmful to pests and not humans. Thus, the duster would be used to contaminate remaining eggs so that they do not hatch and restart the pest problem. Thus, a small amount of the dust in the duster can be spread into the crack. Finally, since a crack on a wall can be a source of future pests, the technician uses the caulk to seal the crack.

The technician can then put an implement that has only an end aperture for suctioning and a light which is on the adapter as a separate unit to accommodate a more powerful lamp. The technician then uses this powerful light and the power of a vacuum with just an end aperture. This adapter is inserted underneath the refrigerator where entire cockroaches are visible and the vacuum is turned on. The powerful vacuum suctions off the cockroaches and other unwanted material. The entire underside of the refrigerator is suctioned properly due to the use of the light. Thus, the homeowner has been provided a service and the technician conveniently treated the homeowner quickly and with minimal or no use of poison (depending on the type of powder used in the duster) to resolve the homeowner's concerns. If the storage container for the unwanted material is full, the technician can replace it (or wash it) before going to the next dwelling to treat.

Headings and subheadings, if any, are used for convenience only and do not limit the invention. Any aspect set forth in any embodiment or example may be used with any other embodiment or example set forth herein. It will be apparent to those skilled in the art that various modifications and variations can be made in the disclosed products and processes without departing from the scope of the disclosure. Other examples of the disclosure will be apparent to those skilled in the art from consideration of the specification and practice of the disclosure disclosed herein. It is intended that the specification and examples be considered as exemplary only and that the present invention is not limited to the details shown. It is expressly intended, for example, that all ranges broadly recited in this document include within their scope all narrower ranges and points which fall within the broader ranges.

All structural and functional equivalents to the elements of the various aspects described throughout this disclosure that are known or later come to be known to those of ordinary skill in the art are expressly incorporated herein by reference and are intended to be encompassed by the claims. Furthermore, to the extent that the term "include," "have," or the like is used in the description or the claims, such term is intended to be inclusive in a manner similar to the term "comprise" as "comprise" is interpreted when employed as a transitional word in a claim.

The invention claimed is:

1. A method for pest control, comprising:
   providing a pest control device which comprises:
   a main body having a curved shape configured to extend partially or completely around a body of a person;
   a hose having a nozzle;
   a collection container operably connected to the hose;
   a vacuum mechanism containing a motor, the vacuum mechanism being operably connected to the collection container and the hose; and
   a battery operably connected to the vacuum mechanism; and
   arranging the main body around the body of the person; and
   activating the vacuum mechanism to suction pests via the hose into the collection container; and drowning the pests with water, wherein the hose, collection container, vacuum mechanism, and battery are operably connected with the main body such that the main body acts as a supporting structure.

2. The method for pest control according to claim 1, wherein the pests are located inside a crevice or opening in a building structure.

3. The method for pest control according to claim 1, wherein the pests are located underneath an appliance or inside a crevice or opening, and wherein the pest control device comprises a light source, and wherein the method further comprises illuminating underneath the appliance or inside the crevice or opening prior to or concurrent with activating the vacuum mechanism to suction the pests via the hose into the collection container.

4. The method for pest control according to claim 1, further comprising directly or indirectly attaching an implement to the nozzle of the hose and suctioning pests via the adapter.

5. The method according to claim 1, wherein the pest control device comprises an implement container and wherein the method for pest control further comprises storing a plurality of implements in the implement container and wherein such implements are configured to engage the nozzle.

6. The method for pest control according to claim 1, wherein the collection container comprises an opening configured to receive water to drown pests inside the collection container.

7. The method for pest control according to claim 1, wherein the pest control device comprises a first implement which comprises a first end and a second end which are separated such that a distance between them is along a longitudinal direction of the implement and wherein the first end comprises one or more light sources which are located on an outer surface of the first end which faces away from the first implement and which are positioned along an outer perimeter of an opening on the first end, and wherein A) the first implement is operably connected with the nozzle of the hose such that the first end is spaced from the nozzle along the longitudinal direction of the implement and away from the hose, or B) the first implement is not attached to the nozzle and is configured to be operably connectable with the nozzle such that the first end is spaced from the nozzle along the longitudinal direction of the implement and away from the hose.

* * * * *